United States Patent Office 3,512,440
Patented May 19, 1970

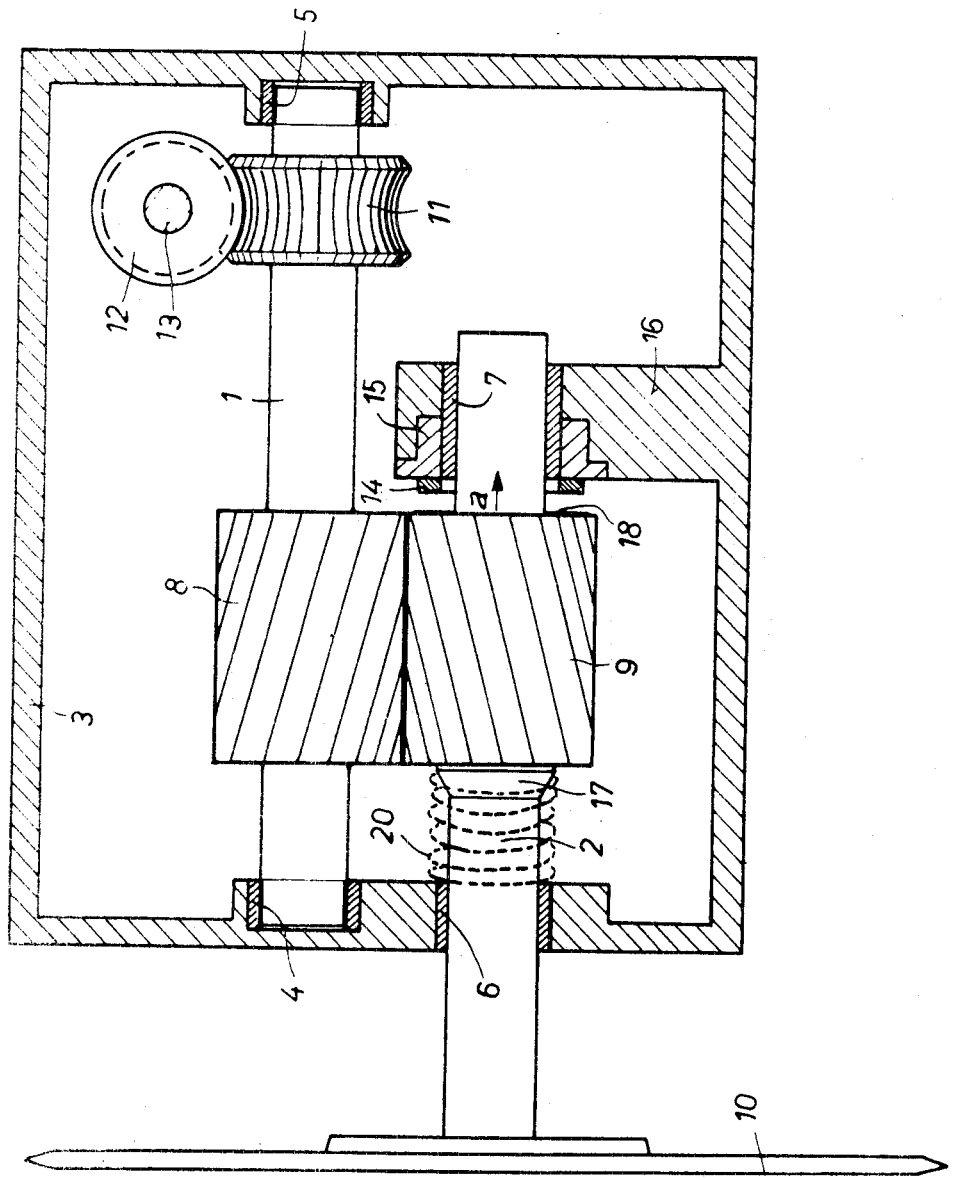

3,512,440
BRAKING DEVICE FOR THE LOAD-CONTROLLED BRAKING OF A DRIVEN, ROTATING COMPONENT
Eduard Frydmann, Kusnacht, Switzerland, assignor to Chr. Eisele Maschinenfabrik, Kongen (Neckar), Germany
Filed Nov. 13, 1967, Ser. No. 682,026
Claims priority, application Switzerland, Nov. 15, 1966, 16,368/66
Int. Cl. B23d *19/00, 47/12;* B26d *1/14*
U.S. Cl. 83—491                                8 Claims

ABSTRACT OF THE DISCLOSURE

A load-controlled braking device for a rotary cutting tool has helically toothed meshing gears mounted respectively on the driving and driven shafts. The gears are so mounted on their shafts and their teeth are so inclined that during application of increased torque on the cutting tool one of the gears, having a braking member fixed thereon, moves axially on its shaft so that the braking member is pressed against the face of a cooperating, immobile braking member with a force that increases as the torque applied to the tool increases.

---

The present invention relates to a braking device for the load-controlled braking of a driven, rotating component. This braking device can especially be applied for installation into the driving gearbox of a circular saw machine, particularly for cutting iron, steel, hard bronze material as well as other alloys.

The circular saw machines for cutting iron and steel (low cutting speed) known up to the present time have a disadvantage in that the crest clearance occurring at the teeth of the driving gear wheels, or between the worm and the worm gear, substantially reduced the service life of the circular saw blade and frequently causes breakage of the same.

To alleviate these troubles, a second worm was brought into mesh with the worm gear to eliminate said worm clearance and prevent the backlash of the worm gear, but this did not provide a satisfactory solution of the problem.

It is also known that a braking device can be installed in the drive of circular sawing machines which, in contrast to preceding solutions, signifies decisive progress. An undesirable property of such braking devices is, however, the fact that the braking pressure of known devices remains constant and, although it does permit of readjustment, for the duration of one operational cycle it always exerts the same braking force, regardless of whether thin- or thick-walled material is being cut. If a timely readjustment of the braking device is once overlooked, the circular saw blade may suffer quite considerable damage.

The forward snap and recoil of the cutting teeth of the saw blade, due to the crest clearance of the driving gears, results in an additional detrimental effect. On the sides of the teeth and to some extent also on the side of the saw blade, so-called seizings or "cold weldings" build up, caused by a frictional effect. This phenomena is undesirable as such accumulations and "weldings" on the saw blade give the blade a substantial blow when it passes through the material being cut and, upon repeated occurrence, this will break the saw blade.

It is the aim of this invention to create a braking device whose braking effect varies, depending on a force counteracting the feed motion.

This is attained in that a pair of helical gears is installed in the driving gear box of the rotating component, the one wheel of which is mounted on its shaft for axially slidable displacement and whose one end face coacts with a fixed brake lining in such a manner that, in compliance with the counter-pressure on the tooth flanks of the meshed helical gears, the end face of the axially slidable wheel is pressed against the brake lining.

The drawing shows an exemplified embodiment of the subject matter of the invention and represents a sectional view of the gearbox of a circular sawing machine.

The gearbox represented has a driving shaft 1 and a driven shaft 2 which are mounted in pairs of bearings 4, 5 and 6, 7 provided in housing 3. On driving shaft 1 there is secured a helically toothed gear 8 that rotates with said shaft and meshes with a helical gear 9 that rotates with splined shaft 2 but is axially slidable on same. As shown in the drawing, the driven splined shaft 2 extends through bearing 6 out of housing 3, whereby a circular shaw blad 10 is secured to its outer end. The driving shaft 1 on the other hand is driven over worm gear 11 by worm 12 mounted on shaft 13.

As soon as shaft 13 is driven, the rotational movement is transmitted by worm 12 and worm gear 11 to driving shaft 1 which in turn transmits the rotational movement due to the meshed helical gears 8 and 9 to driven shaft 2 and thus to circular saw blade 10.

About the shaft bearing 7 supported by bearing stand 16 there is secured an annular braking member 15 which may, for example, be of steel, having a welded-on ring of hard carbide 14, or other materials, that serves as brake liner.

When the circular sawing machine is in operation and saw blade 10 exerts its cutting force on a workpiece, then a force of reaction is produced on the contacting tooth flanks of the helical gear pair 8, 9 having an axially directed force component *a* which pushes gear 9 to the right in the figure against the layer of hard carbide 14 that acts as brake liner. The greater the counterpressure generated at the workpiece is, the greater the feed pressure and the greater the pressure of gear 9 against the brake liner and the greater the braking effect will be.

The driven gear wheel 9, when at rest, is held by stop shoulder 17 of driven splined shaft 2 in such a manner that between the end face 18 of gear wheel 9, which may also be provided with a brake lining, and the braking surface of the layer 14, only a small gap remains of about a few millimeters, so that the end face 18 and hard carbide layer 14 already contact each other upon a slight axial displacement of gear 9, resulting in friction that reduces the rotating speed of gear 9 and consequently of all rotating parts connected therewith. As the friction between the braking surfaces 14 and 18 and, correspondingly, the braking of gear 9, depend on the power of the force counteracting the saw blade, the speed of the saw blade practically adapts itself in every instant to the load encountered. By this means, the teeth of the saw blade constantly remain in identical and even touch with the material of the workpiece. Depending on the width of the material and the advance of the saw blade, this inevitably results in an essentially chatter-free milling, whereby in down-out milling also, both the dangerous recoil as well as the getting caught of the teeth in the material are prevented.

With a corresponding overpressure, the braking pressure may rise until the machine stands still, whereby this latter stage is reached before the saw blade breaks. The gear wheels 8 and 9 installed are so wide that wear due to abrasion may be neglected, even after extensive operation of said gears.

To heighten the effect of the axial thrust, a pressure spring 20—represented on the drawing by dotted lines— may be provided, which keeps gear 9 pressed in contact against the brake liner 14 and so makes possible a more rapid response of the braking system.

As applicable materials for the coacting braking surfaces of gear 9 and the braking components 14, 15, the following combinations come into consideration: cast iron on steel, steel on hardened steel, steel on brass, steel on brake lining, cast iron on brake lining.

According to the respective applicational purpose of the braking device, the desired braking pressure can be obtained by selection of the tooth angle of the helically toothed gears. The gears 8 and 9 are therefore mounted on their shafts and in housing 3 for easy interchanging.

The gears represented run in an oil bath in housing 3, whereby the oil supply is large enough to simultaneously act as coolant for the braking device.

Part 15 of the braking component comprises a relatively large mass of material in order that it can absorb the heat generated by friction at the brake surfaces and transfer said heat to the housing section 16.

If the rotating component that is to be subjected to a load-controlled braking can operate in both directions of rotation, it is naturally possible, where required, to provide one braking system 14, 15 on each end of the axially displaceable helically toothed gear 9 to coact with each end face of said gear.

What is claimed as new and desired to be protected by Letters Patent is set forth in the appended claims.

What is claimed is:

1. A braking device for load-controlled braking of a rotary cutting tool comprising, in combination, a support means; a rotary drive shaft and a rotary driven shaft mounted on said support means; a pair of meshing helically toothed gears respectively mounted on said shafts for rotation therewith and one of said gears being mounted on the respective shaft also for movement in axial direction, said rotary cutting tool being connected to said driven shaft for rotation therewith; and a braking member fixedly mounted on said support means and having a braking face adjacent an end face of said one gear, the inclination of the teeth of said helically toothed gears being arranged in such a manner that during application of increased torque on said rotary cutting tool, said axially movable gear is moved in a direction towards said braking member so that said end face of said axially movable gear is pressed against said face of said braking member with a force increasing with increase of the torque applied to said tool.

2. A braking device as defined in claim 1, wherein said axially movable gear is mounted on said driven shaft.

3. A braking device as defined in claim 1, and including stop means on the shaft on which said axially movable gear is mounted and cooperating with said axially movable gear for limiting axial movement of the latter in the direction away from said braking member.

4. A braking device as defined in claim 1, and including biassing means cooperating with said axially movable gear for biassing the end face of the latter towards said braking member.

5. A braking device as defined in claim 4, wherein said biassing means comprises a coil compression spring engaging said axially movable gear on the end thereof opposte said end face.

6. A braking device as defined in claim 1, wherein said braking face is an annular face coaxial with the axis of said axially movable gear.

7. A braking device as defined in claim 1 wherein said support means comprises a closed gear box in which said gears are located.

8. A braking device as defined in claim 2, wherein said rotary tool is a circular sawblade mounted on said driven shaft for rotation therewith.

References Cited

UNITED STATES PATENTS

| | | | |
|---|---|---|---|
| 2,728,428 | 12/1955 | Cohen | 188—134 X |
| 2,949,980 | 8/1960 | Ericsson et al. | 188—134 X |
| 3,219,154 | 11/1965 | Schenck et al. | 188—134 |
| 3,329,243 | 7/1967 | Gibb | 188—134 |
| 3,367,456 | 2/1968 | Bohnhoff | 197—7 X |

FOREIGN PATENTS 918,063   9/1954   Germany.

WILLIAM S. LAWSON, Primary Examiner

U.S. Cl. X.R.

83—591; 188—134; 197—7